United States Patent [19]

Foster

[11] Patent Number: 4,571,150
[45] Date of Patent: Feb. 18, 1986

[54] RECIPROCATING FLOOR CONVEYOR METHOD

[76] Inventor: Raymond K. Foster, P.O. Box 1, Madras, Oreg. 97741

[21] Appl. No.: 642,200

[22] Filed: Aug. 20, 1984

Related U.S. Application Data

[62] Division of Ser. No. 364,864, Feb. 2, 1982, Pat. No. 4,492,303.

[51] Int. Cl.$^4$ ............................................. B65G 65/34
[52] U.S. Cl. ..................................... 414/786; 198/623; 414/300; 414/325; 414/353; 414/525 R
[58] Field of Search ............... 414/293, 300, 303, 304, 414/325, 352, 353, 373, 525 A, 525 R, 572, 573, 574, 786; 198/750, 623

[56] References Cited

U.S. PATENT DOCUMENTS

| | | | |
|---|---|---|---|
| 2,717,703 | 9/1955 | Kull et al. | 414/300 X |
| 2,973,856 | 3/1961 | Brooks | 198/773 X |
| 3,013,675 | 12/1961 | Schonrock | 414/293 |
| 3,525,446 | 8/1970 | Grafstrom | 414/525 |
| 3,534,875 | 10/1970 | Hallstrom, Jr. | 198/750 X |
| 3,578,183 | 5/1971 | Larger | 414/293 |
| 4,020,958 | 5/1977 | Wheeler | 414/373 |
| 4,056,202 | 11/1977 | Mackenzie et al. | 414/327 X |
| 4,143,760 | 3/1979 | Hallstrom | 198/775 X |
| 4,363,586 | 12/1982 | Gessler et al. | 414/325 |
| 4,492,303 | 1/1985 | Foster | 414/525 B |

FOREIGN PATENT DOCUMENTS 683091   3/1964   Canada ............................... 414/573

Primary Examiner—Robert J. Spar
Assistant Examiner—Stuart J. Millman
Attorney, Agent, or Firm—Delbert J. Barnard

[57] ABSTRACT

Generally horizontally disposed bracing trusses (44, 46) are interconnected between the bottoms of the longitudinal drive beams (70, 72, 74) and the bottoms of the associated transverse drive beams (100, 102, 104), within a reciprocating floor conveyor. This and other reinforcement particularly adapts the system for use in a stationary installation having a relatively wide floor. Trucks (RV) equipped with reciprocating floor conveyors are backed into a receiving house (H) and the conveyors are used for unloading bulk material (B) from the trucks (RV) into the receiving house (H). The bulk material (B) is conveyed from the receiving house (H) up to an elevated inlet (16) at one end of an elongated enclosure (E). The enclosure (E) includes a reciprocating floor conveyor (24) at its bottom and an elevated screw conveyor (36) at its top. The reciprocating conveyor (24) is operated to move bulk material out from the enclosure (E) at a controlled rate. The elevated screw conveyor (36) is used for rapidly distributing additional bulk material (B) that is being added at the elevated inlet (16) and the trailing portion of a previous deposit of the bulk material (B') which has been moved away from the elevated inlet (16) by the reciprocating floor conveyor (24).

3 Claims, 8 Drawing Figures

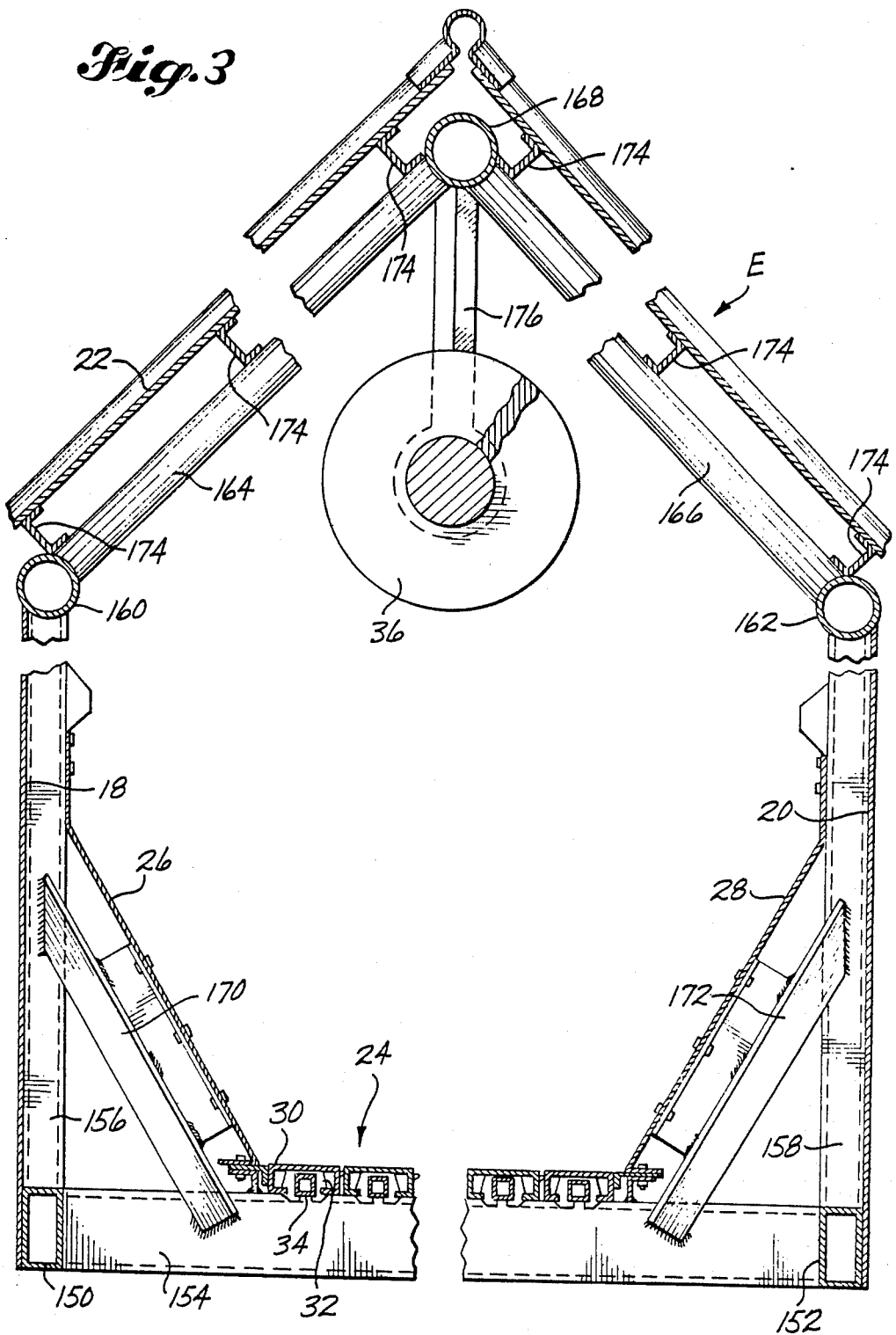

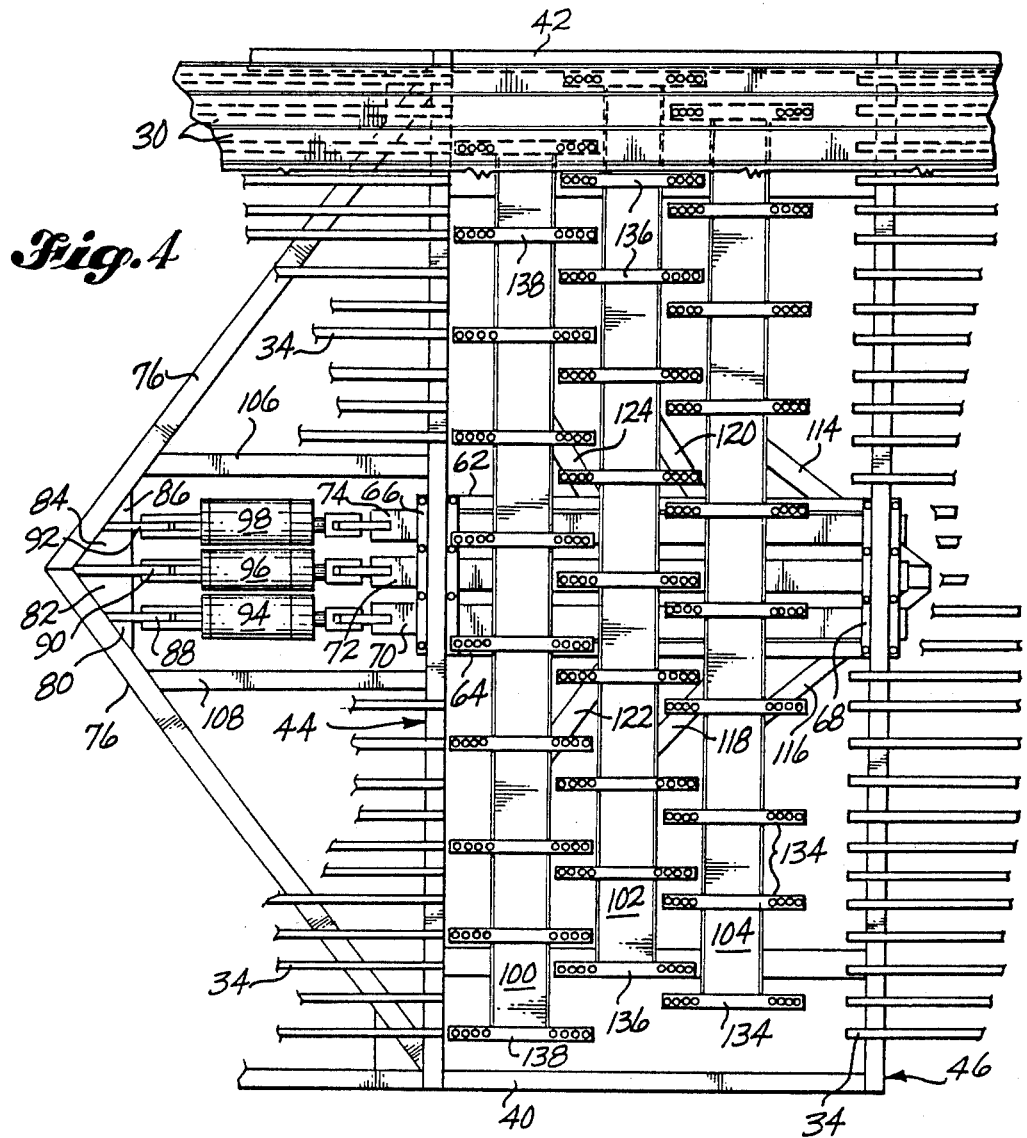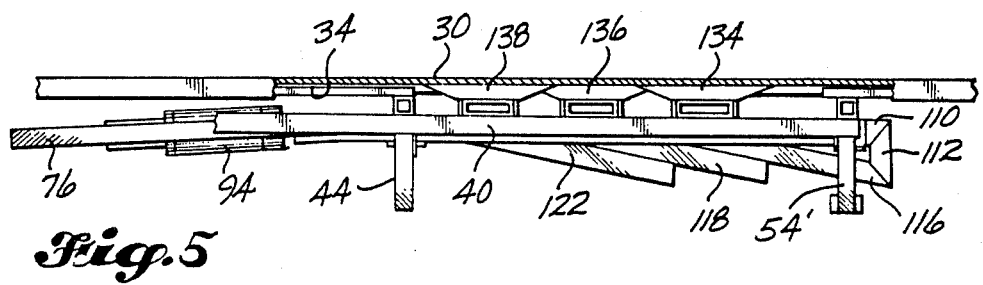

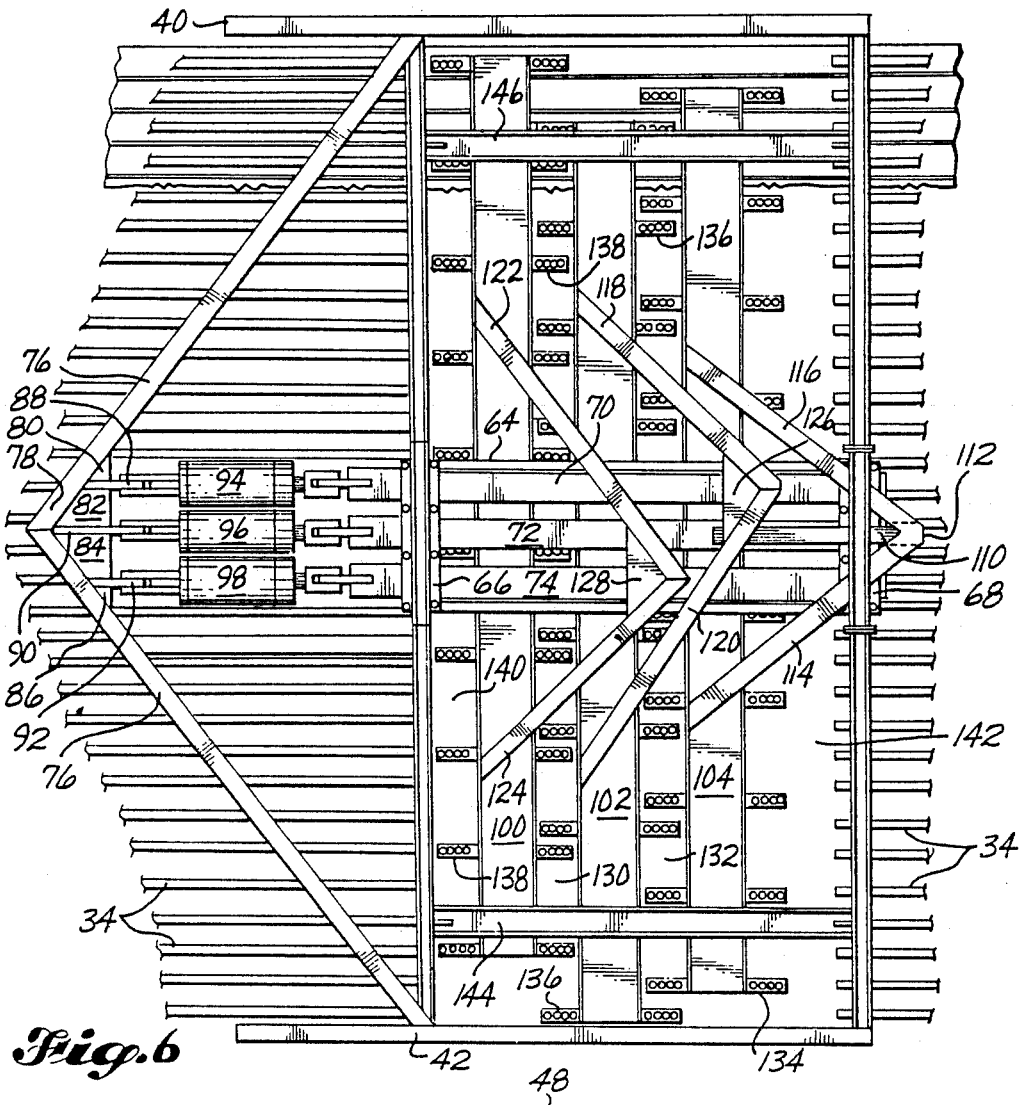

RECIPROCATING FLOOR CONVEYOR METHOD

This is a division of application Ser. No. 364,864, filed Feb. 2, 1982, now U.S. Pat. No. 4,492,303, issued Jan. 8, 1985.

TECHNICAL FIELD

This invention relates to improvements in reciprocating floor type conveyors, and in particular to the provision of a structurally reinforced modular drive unit for a reciprocating floor conveyor, a stationary installation utilizing such a conveyor, and a method of handling bulk material from road vehicles to a station of use, involving the use of vehicles equipped with reciprocating floor conveyors and a stationary installation equipped with a reciprocating floor conveyor and an associated rapid feed conveyor for delivering bulk material into the enclosure.

BACKGROUND ART

The present invention in part involves an improvement on the type of conveyor structure that is disclosed by U.S. Pat. No. 4,143,760, granted Mar. 13, 1979 and U.S. Pat. No. 4,184,587, granted Jan. 22, 1980, both to Olaf A. Hallstrom.

Additional, earlier forms of reciprocating floor conveyors are disclosed by U.S. Pat. No. 2,629,504, granted in February of 1953 to Peterson; by U.S. Pat. No. 2,973,856, granted in March of 1961 to Brooks; by U.S. Pat. No. 3,534,875, granted in October of 1970 to Hallstrom; and by West German Patent Publication No. 1,296,087, published in May of 1969. These patents are not particularly pertinent to the subject invention and require no further comment.

DISCLOSURE OF THE INVENTION

One aspect of the invention involves the provision of a modular drive unit which includes a plurality of longitudinal drive beams which are mounted onto a frame for longitudinal reciprocation. A plurality of transverse drive beams, one for each longitudinal drive beam, extend across the tops of the longitudinal drive beams. Each is connected to a related one of the longitudinal drive beams where the two of them cross. A source of drive power is provided for each longitudinal drive beam. Each drive power source is interconnected between an end of the longitudinal drive beam and a portion of the frame. Each transverse drive beam carries connector means on upper portions thereof to which the elongated floor members are secured.

According to an aspect of the invention, a generally horizontal reinforcing truss is interconnected between each transverse drive beam and its longitudinal drive beam, below the drive unit. Each horizontal truss comprises a pair of diagonal beams having inner ends which are connected to the longitudinal drive beam and outer ends which are connected to the associated transverse drive beam, at locations thereon spaced laterally outwardly from the longitudinal drive beam, on opposite sides thereof.

Preferably, the modular drive unit comprises three longitudinal drive beams and three transverse drive beams. Preferably also, the center longitudinal drive beam includes a downwardly depending connector member at the end thereof which is opposite where such beam is connected to a source of drive power. The inner ends of the diagonal beams of the associated truss are connected to a lower end portion of such structure member.

According to another aspect of the invention, when the transverse drive beams are all retracted or are all advanced, such transverse drive beams are separated by a considerable space. The spaces between the transverse drive beams, and additional spaces outwardly of the transverse drive beam assembly, provide easy access to connector openings in projecting end portions of the connector means which are carried by the transverse drive beams. As a result of this spacing, equal length connector members may be used on each of the transverse drive beams, and each such connector can be centered with respect to its transverse drive beam. In addition to locating the fastener openings carried by the projecting end portions of said connectors within easy access space for the workmen who connect the floor members to the connector means, such arrangement results in the connector means being relatively short in length. The relatively short length of the connector means, plus the fact that they are all connected within their middle portions to the transverse drive beams, results in the amount of warping of the connector means, caused by the welding process, being minimized. The heat of welding will cause the projecting end portions to turn upwardly slightly. Problems caused by this fact are minimized when the projecting end portions of the connectors are relatively short.

According to another aspect of the invention, the modular drive unit carries a pair of laterally spaced apart, longitudinally extending bearing beams. Each of these beams includes a surface of bearing material which rests against lower surface portions of the transverse drive beams.

In accordance with another aspect of the invention, such modular drive unit, or a suitable similar unit, is mounted within an elongated stationary enclosure, which also includes an elevated screw type conveyor, or the like, extending from an elevated inlet at one end of the enclosure to a discharge opening or outlet at the opposite end of the enclosure. Additional bulk material is fed into the inlet and the elevated conveyor serves to rapidly advance such material into any void space which might exist between the inlet and the trailing portion of a previous deposit which has been advanced forwardly by the reciprocating floor conveyor in the enclosure.

Another important aspect of the invention relates to the provision of a method of handling bulk material from a load vehicle to a point of use. According to such method, the vehicle is provided with a storage compartment for the bulk material which includes a reciprocating floor conveyor, operable for discharging the bulk material out from the storage compartment, through a rear opening in the compartment. The bulk material is discharged from the storage compartment in the vehicle into a receiving housing having an inlet sized to receive a rear portion of the storage compartment carried by the vehicle. Such bulk material is conveyed from the receiving housing to an elevated inlet at one end of an elongated storage enclosure. The bulk material, as it is being added to the enclosure, is discharged in close proximity to the receiving end of an elevated conveyor within the enclosure. A reciprocating floor conveyor within the enclosure is used for advancing the bulk material to an outlet spaced from the inlet. The elevated conveyor is operated for distributing newly added bulk material longitudinally through the conveyor, from the inlet of the enclosure to the trailing end of an advancing previous deposit of the bulk material within the enclosure. The bulk material is conveyed out from the storage enclosure, to point of use, as needed.

These and other objects, features and advantages of the invention will be apparent from the details of the preferred embodiments which are both illustrated and described.

BRIEF DESCRIPTION OF THE DRAWINGS

In the drawings, like element designations refer to like parts throughout, and

FIG. 3 is a cross-sectional view taken through the storage building;

FIG. 4 is a top plan view of a modular drive unit constructed in accordance with an aspect of the present invention, shown installed, with portions of the conveyor floor members and their guide beams shown;

FIG. 5 is a side elevational view of the modular drive unit shown by FIG. 4;

FIG. 6 is a bottom plan view of the modular drive unit shown by FIGS. 4 and 5;

FIG. 7 is an end elevational of the truss at the powered end of the modular drive unit; and FIG. 8 is an elevational view of the truss at the opposite end of the modular drive unit.

BEST MODE OF THE INVENTION

Figure 1:
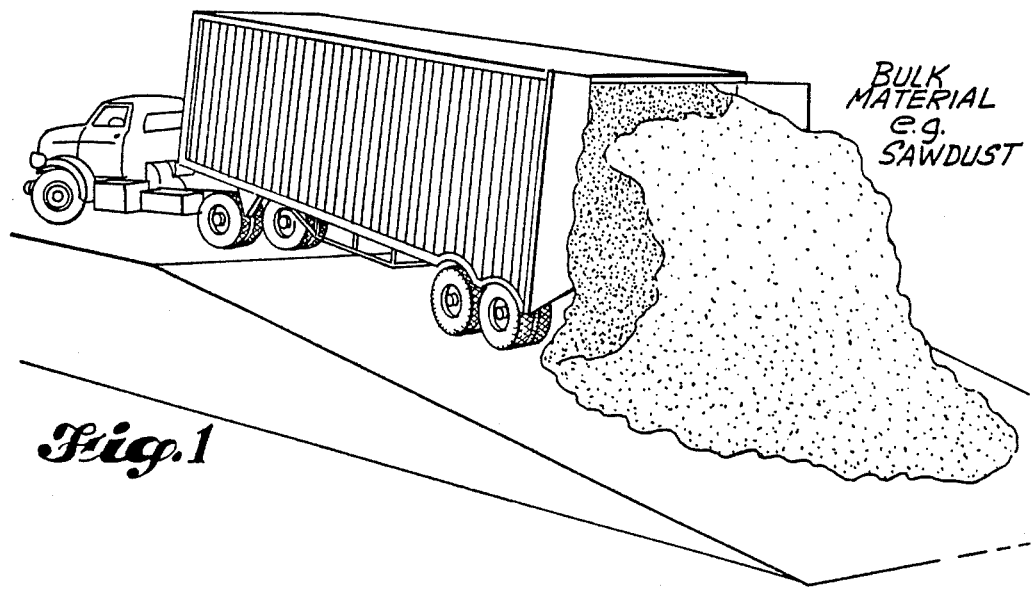
FIG. 1 is a pictorial view of a truck that is equipped with a reciprocating floor conveyor constructed in accordance with the present invention, shown in the process of using the conveyor to discharge a load.

FIG. 1 shows a load of sawdust or other bulk material being unloaded from a large truck T by use of a reciprocating floor conveyor which is located within the truck T.

Figure 2:
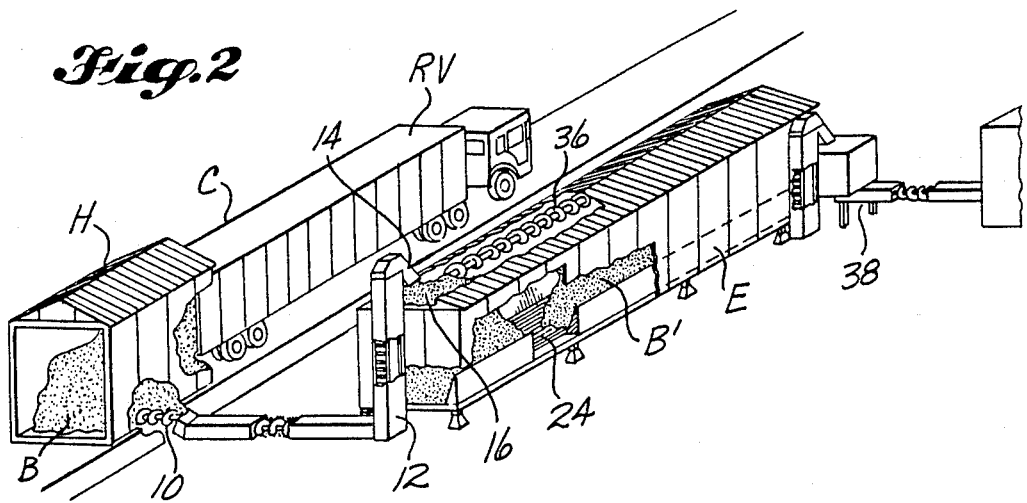
FIG. 2 is a unique conveyor system constructed in accordance with one aspect of the present invention, in which a reciprocating floor conveyor is combined in a novel manner with an overhead screw conveyor in the storage building.

FIG. 2 is a pictorial view of both a stationary installation for a reciprocating floor conveyor and a system utilizing two of such conveyors, one within the cargo carrying compartment C of a road vehicle RV and the other within a fixed housing or enclosure E.

The operation of the preferred embodiment of reciprocating floor conveyor is well described in the aforementioned U.S. Pats. Nos. 4,143,760 and 4,184,587. The major components of such a system are hereinafter described in connection with FIGS. 3-8. However, the operation of the floor conveyor, including the details of a preferred hydraulic drive and control system, are not described. For a description of such mechanism and its operation, reference is made to the aforementioned U.S. Pats. Nos. 4,143,760 and 4,184,587, and to my U.S. Pat. No. 4,492,303, granted Jan. 8, 1985, and entitled "Drive/Guide System For A Reciprocating Floor Conveyor".

Referring to FIG. 2, the road vehicle RV is backed up to place a rear opening in the compartment C into alignment with a receiving opening in a receiving housing H. The floor within the road vehicle RV is operated to discharge the bulk material into the interior of housing H. At the same time, a screw conveyor or the like 10 is operated to remove the bulk material from housing H onto a suitable elevator 12. Elevator 12 is shown in the form of a vertically extending bucket type conveyor having an outlet chute 14 positioned to discharge the bulk material B into an elevated inlet 16 provided at the receiving end of the enclosure E. Of course, other types of conveying and elevating equipment can be substituted for the mechanisms 10, 12. For example, the bulk material B can be moved from the housing H by use of fluid power. The fluid energy can be used for lifting the material up into a cyclone having a discharge hopper positioned in place of the chute 14.

As shown by FIGS. 2 and 3, the enclosure comprises frame and wall structure defining a pair of spaced apart sidewalls 18, 20, and a top structure 22. These elements extend for the full length of the enclosure E.

A reciprocating floor conveyor 24 is provided in the central floor portion of the enclosure E. In the illustrated embodiment, the floor 24 does not extend entirely across the width of the enclosure E. Rather, sloping walls 26, 28 are provided along each side of the conveyor 24, in the manner illustrated.

FIG. 3 shows that the floor members 30 are supported on and are guided by plastic slide bearings 32 which in turn are snap fitted onto elongated guide tubes 34. The guide tube-to-bearing-to-floor-member relationship is described in my aforementioned U.S. Pat. No. 4,492,303. Hence, it will not be described in detail in this document.

As shown by FIGS. 2 and 3, an elevated screw conveyor 36 or the like is supported in an upper central portion of the enclosure E. Conveyor 36 is power driven and includes a receiving end located adjacent where bulk material enters the enclosure E through inlet 16. Conveyor 36 preferably extends throughout essentially the entire length of the enclosure E.

As shown by FIG. 2, the reciprocating floor conveyor 24 within enclosure E is operated for moving a deposit B' of the bulk material through the enclosure to a suitable outlet at the end thereof opposite the inlet 16. At the outlet the bulk material B' is removed from the enclosure E by additional power conveyor equipment (the type of which is not particularly important to the invention) on to a use station. This additional conveying equipment is designated 38 in FIG. 2. It and the reciprocating floor conveyor are operated to move bulk material B' from the enclosure E as it is needed.

As shown by FIG. 2, when a given deposit of the bulk material B' is being advanced by the reciprocating floor 24, it develops a sloping rear boundary which progressively moves away from the inlet end of the enclosure E. The elevated conveyor 36 provides a way of quickly distributing additional bulk material B as it is delivered into the enclosure E. Conveyor 36 is rotated at a relatively fast speed, and it operates to swiftly move the added bulk material B forwardly in the enclosure E, until it catches up with the previous deposit B'. By use of the elevated conveyor 36, the void between the inlet end of the enclosure E and the trailing portion of the previous deposit B' can be quickly filled.

Referring now to FIGS. 4-8, the basic framework of the modular drive unit comprises a pair of laterally spaced apart, elongated side beams 40, 42, interconnected by a pair of laterally extending, vertical, queens trusses 44, 46.

As best shown by FIGS. 7 and 8, each truss 44, 46 comprises an elongated, horizontal upper frame member 48, a pair of diagonal frame members 50, 52, and a horizontal bottom member 54. The outer end portions of the diagonal members 50, 52 are welded to outer end portions of the upper members 48. A pair of vertical members 56 depend from laterally spaced apart points of connection at their upper ends to the upper members 48, down to points of connection at their lower ends with the diagonal members 50, 52. Each of the components of each truss 44, 46 is preferably manufactured from thin walled, square tubular stock. With the exception of member 54', which is connected in such a manner as to be removable, the other frame members are welded together at their ends where they meet. Frame member 54' may be provided with bolt plates 58 at its ends which match with corresponding bolt plates 60 carried by the inner ends of the diagonal members 50, 52. The bolt plates 58, 60 are bolted together, such as by the use of four bolts, one at each corner location. Member 54' is made to be removable for the purpose of disassembly of the unit.

In addition to being structurally interconnected at their ends by the side members 40, 42, the trusses 44, 46 are interconnected in their central regions by tie beams 62, 64. The tie beams 62, 64 extend between end portions of a pair of guide bearing assemblies 66, 68. These guide bearing assemblies will not be specifically described because they are quite well described in my aforementioned U.S. Pat. No. 4,492,303, the contents of which are hereby specifically incorporated herein by this reference. It will be said, however, that the bearing assemblies 66, 68 provide pairs of aligned slideways or slide bearings for longitudinal drive beams 70, 72, 74.

As shown by FIGS. 4 and 6, the basic frame structure includes a pair of diagonal brace beams 76 which are attached at their outer ends to the frame members, approximately where the ends of truss 44 are joined to the side members 40, 42. The diagonal members 76 converge as they leave these points of connection and meet at an apex 78 at which they are joined together. The apex is suitably strengthened by a plurality of filler members 80, 82, 84, 86. A plurality of anchor straps 88, 90, 92 are sandwiched between the members 80, 82, 84, 86, in the manner illustrated, and they extend longitudinally of the frame towards truss 44. These members 88, 90, 92 have projecting end portions which serve as the central portions of knuckle joint type pivotal connections between the frame and one end of each of a set of double acting hyraulic cylinders 94. The opposite ends of the cylinders 94 are connected, by similar pivot joint connections, to the adjacent ends of the longitudinal drive beams 70, 72, 74.

A hydraulic system for sequencing the cylinders 94 is thoroughly described in the aforementioned U.S. Pat. No. 4,143,760. Hence, it will not be repeated in this document.

The drive unit also comprises a plurality of transverse drive beams 100, 102, 104. These beams 100, 102, 104 extend transversely across the longitudinal drive beams 70, 72, 74, and each is separately connected to a related one of the longitudinal drive beams 70, 72, 74 where the two cross.

A pair of longitudinally extending tie members 106, 108 are interconnected between portions of diagonal members 76 which are adjacent the reinforcement at the members' apex and corresponding locations on the truss 44. These tie members 106, 108, and the earlier described tie members 62, 64, all function to strengthen the central region of the modular frame, and brace the trusses 44, 46 against buckling in the direction of floor member travel. As is shown by FIGS. 4-8, the central region of the frame portion of the modular unit is substantially reinforced both longitudinally and laterally.

The horizontal portions of the trusses 44, 46 between the vertical members 56, and such vertical members 56, and the tie beams 62, 64, 106, 108 provide the central frame region a definite form and rigidity. The components of the guide bearing assemblies 66, 68 also contribute to stiffen the central region of the frame.

According to an important aspect of the invention, a horizontal reinforcing truss is interconnected between each longitudinal drive beam and its transverse drive beam. Use of these trusses makes it possible to construct a relatively wide modular unit while still using only a single, centrally located longitudinal drive beam for each transverse drive beam. This construction is particularly suitable for use in stationary installations, such as in the bunker installation shown by FIG. 2, because the floors in such installations are usually wider than the floors in a truck or trailer.

As shown by FIGS. 4-6, each horizontal truss (designated 114, 116 and 118, 120 and 122, 124) comprises a single pair of diagonal members, the inner ends of which meet and are secured to the longitudinal drive beam of the related drive structure, and the outer ends of which are secured to locations on the related transverse drive beam which are spaced laterally outwardly from the longitudinal drive beam, on opposite sides thereof.

Center longitudinal drive beam 72 includes an end extension 110 (FIG. 6) which is connected to the upper end of a vertical connector member 112. The lower end of the vertical connector 112 is connected to the inner ends of the diagonal truss members 114, 116.

The diagonal members 118, 120 of the truss connecting transverse drive beam 102 with longitudinal drive beam 70, have a reinforced apex 126 which is offset from center, so as to place it on the longitudinal drive beam 70. The third truss comprises diagonal members 122, 124, which have a reinforced apex 128 which is offset in the opposite direction, placing it on longitudinal drive member 74.

As best shown by FIG. 5, each of the three trusses of necessity slopes downwardly, as it extends from its locations of connection to its transverse drive beam to its location of apex connection to its longitudinal drive beam. This is because the longitudinal drive beams 70, 72, 74 are positioned below the transverse drive beam members 100, 102, 104, and each of the truss members 114, 116 and 118, 120 and 122, 124 must extend from bottom surface portions of the transverse drive members 100, 102, 104 vertically below the associated longitudinal drive members 70, 72, 74, so that it can be connected to the lower surface of such longitudinal drive members 70, 72, 74. Preferably, the end portions of the diagonal members 114, 116 and 118, 120 and 122, 124 are cut at a slant where they cross the transverse drive beams 100, 102, 104, and they are welded to the transverse drive beams 100, 102, 104, preferably by fillet welds, along each side of each diagonal member 114, 116 and 118, 120 and 122, 124. Triangular blocks 126, 128 are cut to fit so that the lower surfaces of such members 126, 128 are each in the general plane of the bottom of its truss, and the upper portions of the members 126, 128 are each in the plane of the bottom surface of its longitudinal drive member 70, 74. The members 126, 128 are welded along edges to the longitudinal drive beams 70, 74 and the truss beams 118, 120 and 122, 124 are welded to the members 126 and 128, respectively.

The use of the generally horizontal bracing trusses also result in it not being possible to move the transverse drive beams 100, 102, 104 close together. Rather, quite large spaces, closely equal to the widths of the transverse drive beams 100, 102, 104, are defined between the transverse drive beams 100, 102, 104. However, this is not a disadvantage. Rather, the spaces 130, 132 make it easier for the workmen to attach the floor members.

Each transverse drive beam carries a plurality of floor member connectors. Some of the connectors which are connected to transverse drive beam 104 are designated 134. Some of the connectors carried by transverse drive beam 102 are designated 136. Some of the connector members associated with transverse drive beam 100 are designated 138. Preferably, the connector members or beams 134, 136, 138 are equal in length and each is connected at its center to its transverse drive beam 100, 102, 104. Each includes apertured end portions which project laterally of the transverse drive beams 100, 102, 104, and longitudinally of the floor structure as a whole, on opposite sides of the transverse drive members 100, 103, 104. Additional access spaces 140, 142 are provided outwardly of each transverse drive beam 100, 104.

An advantage of using short connector members 134, 136, 138 which are attached to the transverse drive beams 100, 102, 104 at their centers, such as by welding, is that the welding heat will always cause the projecting end portions of the connectors 134, 136, 138 to deflect slightly. The shorter the projection of these members, the less effect the deflection has on the connection that is made between the connector members 134, 136, 138 and the floor members.

According to another aspect of the invention, longitudinal bearing beams 144, 146 are provided outwardly from the longitudinal drive assembly 70, 72, 74, closely adjacent the side members 40, 42 of the frame. These members 144, 146 are welded at their ends to portions of the trusses 44, 46. Hence, they also function to tie the two trusses 44, 46 together. They also include a bearing surface, e,g, a layer of sheet plastic, against bottom surface portions of the transverse drive beams 100, 102, 104. Thus, weight is transferred from the transverse drive beams 100, 102, 104 at the location of beams 144, 146, but with the contact being low in friction.

The drive mechanism for the elevated conveyor 36 shown in FIGS. 2 and 3 is not shown. By way of example, it can be a variable speed hydraulic motor which is connected to the shaft of the screw conveyor 36. An adjustable speed motor is preferably used so that the conveying speed of the conveyor 36 can be adjusted.

The enclosure E may comprise a lower frame structure comprising longitudinal tubular beams 150, 152, interconnected at intervals by transverse tubular beams 154. The guide beams 34 for the floor members 30 are preferably welded to the upper surfaces of the beams 154 where they cross such beams 154. The above described modular unit is incorporated into the floor and the upper surfaces of its upper truss members 48, serve as the end securement points for the two groups of guide beams 34, which are situated on opposite ends of the space in which the transverse drive beams 100, 102, 104 reciprocate.

The floor members 30 are attached to the connectors 134, 136, 138. In other respects they are free of connection and are allowed to travel relative to the guide beams 34, on the plastic slide bearings 32 which are positioned thereon, preferably at each location where a longitudinal guide beam 34 crosses a transverse beam.

Referring back to FIG. 3, the enclosure E can be easily made by securing a plurality of tubular vertical frame members 156, 158 onto the longitudinal frame members 150, 152. Upper longitudinally extending tubular frame members 160, 162 are secured to the upper ends of the vertical members 156, 158. Sloping diagonal tubular frame members 164, 166 are connected at their lower ends to the longitudinal tubes 160, 162 and at their upper ends to a common longitudinally extending tube 168 at an apex.

Brace beams 170, 172, which may be short lengths of angle iron, extend between the vertical members 156, 158 and the horizontal members 154 and are welded at their ends to these members. The sidewalls 18, 20 are completed by securing panels of sheeting to the outer portions of the frame members 150, 156, 160 and 152, 158, 162. In similar fashion, a roof structure 22 is provided, but with the roof member sheeting being secured to stringers 174 which are in turn secured to the diagonal frame members 164, 166.

The overhead screw conveyor 36 may be supported from the apex beam 168, by hangers 176.

I claim:

1. A method of handling bulk material from a road vehicle to a point of use, comprising:
   providing the vehicle with a storage compartment for the bulk material which includes a reciprocating floor conveyor, operable for discharging the bulk material out from said storage compartment through a rear opening in the compartment;
   discharging such bulk material from the storage compartment in the vehicle, by operation of the reciprocating floor conveyor, into a receiving housing having an inlet sized to receive a rear portion of the storage compartment carried by the vehicle;
   conveying the bulk material from the receiving housing to an elevated inlet at one end of an elongated storage enclosure;
   subjecting the bulk material to the receiving end of an elevated conveyor within said enclosure as it is added to said enclosure;
   providing said enclosure with a reciprocating floor conveyor for advancing the bulk material to an outlet from said enclosure at the end thereof opposite the elevated inlet; operating the reciprocating floor conveyor for advancing bulk material to said outlet; and
   operating the elevated conveyor at a higher longitudinal conveying speed than that of said floor conveyor for distributing newly added bulk material through the enclosure, from the inlet of the enclosure to the trailing end of an advancing deposit of the bulk material within the enclosure to thereby eliminate gaps in the advancing material formed by uneven feed at said inlet; and
   conveying the bulk material out from the outlet end of the storage enclosure to a point of use, as needed.

2. A method of feeding bulk material, comprising:
   providing an elongated enclosure having a reciprocating floor conveyor for a bottom, an elevated inlet at one end, and an outlet at the opposite end;
   discharging bulk material through said elevated inlet, onto the reciprocating floor conveyor;
   operating the reciprocating floor conveyor for advancing the bulk material to said outlet, and feeding it out through said outlet, at a controlled feed rate;

periodically adding additional bulk material into the enclosure, through the elevated inlet;

providing an elevated conveyor within said enclosure, extending from a region within said enclosure adjacent the inlet, whereat newly added bulk material will pile up on the reciprocating floor conveyor; and operating the elevated conveyor at a higher longitudinal conveying speed than that of said floor conveyor for moving newly added bulk material through the enclosure, from a deposit at the inlet end of the enclosure to the trailing end of an advancing prior deposit of the bulk material on the reciprocating floor conveyor, for transferring newly deposited bulk material to the advancing deposit to thereby eliminate gaps in the advancing material formed by uneven feed at said inlet, so that bulk material will always be present at the outlet.

3. A method according to claim 2, wherein the elevated conveyor is an endless screw conveyor element positioned in an upper portion of the enclosure, and having a receiving end positioned to be within the upper portion of the deposit of bulk material at the inlet end of the enclosure, and rotating said screw conveyor element when a new deposit of bulk material is added through the inlet, for moving such bulk material through the enclosure to the trailing end of the advancing prior deposit of bulk material.

* * * * *